United States Patent
Akpan

[11] Patent Number: 5,815,789
[45] Date of Patent: Sep. 29, 1998

[54] METHOD FOR PRODUCING SELF LUBRICATING POWDER METAL CYLINDER BORE LINERS

[75] Inventor: Edward Akpan, Novi, Mich.

[73] Assignee: Ford Global Technologies, Inc., Dearborn, Mich.

[21] Appl. No.: 676,760

[22] Filed: Jul. 8, 1996

[51] Int. Cl.$^6$ .................................. B22F 3/26; B22F 5/00
[52] U.S. Cl. .................................. 419/2; 419/10; 419/27; 419/36; 419/38; 419/44
[58] Field of Search .................... 419/2, 10, 27, 419/36, 38, 44

[56] References Cited

U.S. PATENT DOCUMENTS

| | | |
|---|---|---|
| 3,536,123 | 10/1970 | Isumi . |
| 3,709,108 | 1/1973 | Alger, Jr. et al. .......................... 92/169 |
| 3,903,951 | 9/1975 | Kaneko et al. . |
| 4,419,971 | 12/1983 | Nakamura et al. . |
| 4,495,907 | 1/1985 | Kamo .................................. 123/193 C |
| 4,537,167 | 8/1985 | Eudier et al. ......................... 123/193 C |
| 4,562,799 | 1/1986 | Woods et al. . |
| 4,650,644 | 3/1987 | Huret et al. . |
| 4,655,610 | 4/1987 | Al-Jaroudi . |
| 4,936,270 | 6/1990 | Ushio et al. . |
| 4,959,276 | 9/1990 | Hagiwara et al. . |
| 5,164,256 | 11/1992 | Sato et al. . |
| 5,280,819 | 1/1994 | Newkirk et al. ........................... 104/98 |
| 5,325,732 | 7/1994 | Vogel ................. 74/424.8 R |
| 5,332,422 | 7/1994 | Rao .......................................... 75/252 |
| 5,408,964 | 4/1995 | Rao . |
| 5,445,790 | 8/1995 | Hu et al. . |
| 5,469,821 | 11/1995 | Gosch . |
| 5,482,637 | 1/1996 | Rao et al. . |
| 5,482,671 | 1/1996 | Weber . |
| 5,484,662 | 1/1996 | Rao . |

*Primary Examiner*—Daniel J. Jenkins
*Attorney, Agent, or Firm*—Joseph W. Malleck, Esq.; Roger L. May, Esq.

[57] ABSTRACT

A method for producing self lubricating powder metal cylinder bore liners for an internal combustion engine includes the steps of loading a powder metal mixture into a die cavity, compacting the powder metal mixture in the die cavity and forming the powder metal cylinder bore liner having a porous structure, sintering the powder metal cylinder bore liner, and impregnating the porous structure of the cylinder bore liner with lubricant.

12 Claims, 3 Drawing Sheets

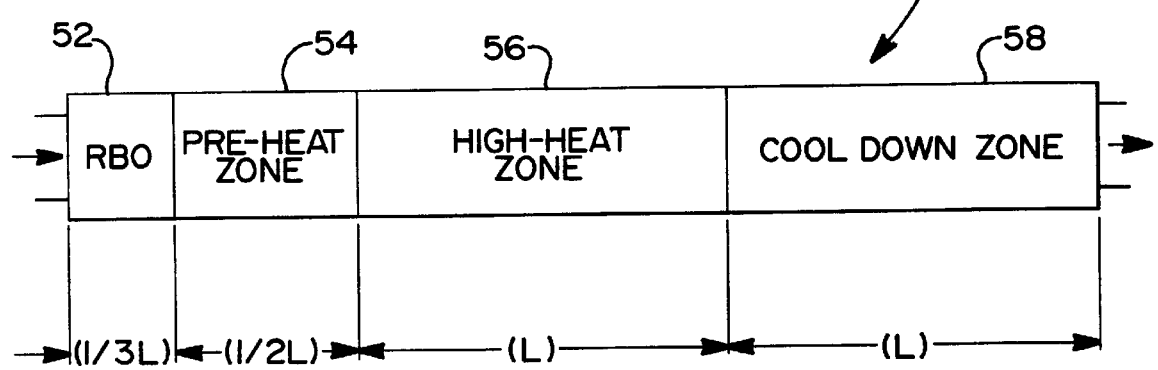
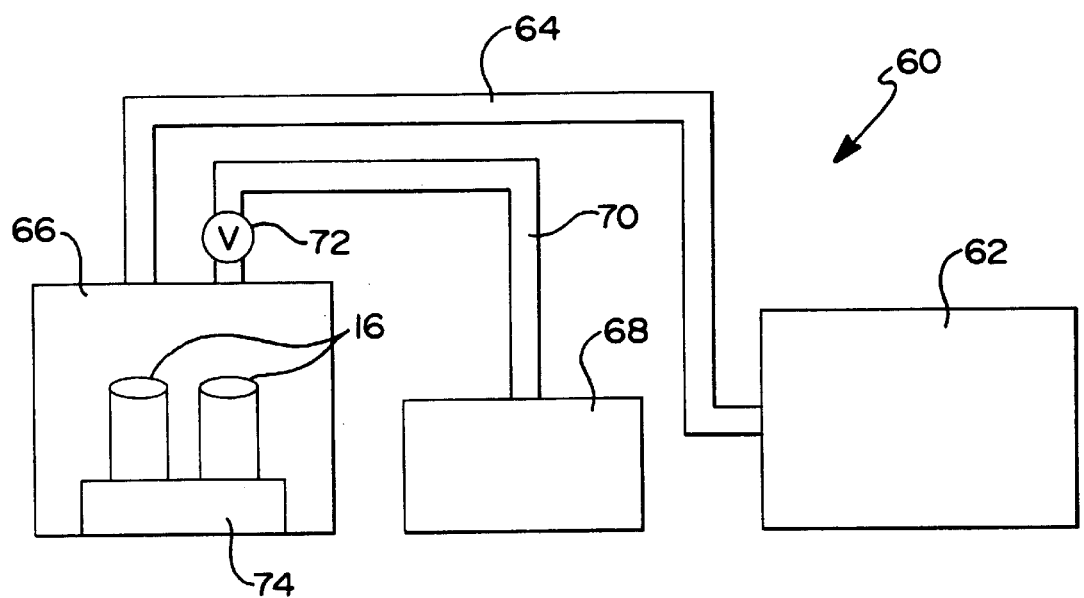

METHOD FOR PRODUCING SELF LUBRICATING POWDER METAL CYLINDER BORE LINERS

BACKGROUND OF THE INVENTION

1. Field of the Invention

The present invention relates generally to cylinder bore liners for internal combustion engines and, more specifically, to a method for producing self lubricating powder metal cylinder bore liners for an internal combustion engine.

2. Description of the Related Art

It is known to provide cylinder bore sleeves/liners for an internal combustion engine. Typically, the liners are made with cast iron materials. These liners are centrifically cast into tubes which are subsequently machined and cut to desired dimensions. The liners have an inside diameter or surface which is honed for oil retention and flow.

Although the above cast iron cylinder bore liners have worked well, they suffer from the disadvantage that the liners are relatively expensive and time intensive to machine, resulting in relatively low volume production. Also, the cast iron cylinder bore liners are relatively high in weight and scrap material from machining. Further, these liners suffer from the disadvantage that they do not possess self lubricity and usually undergo costly honing patterns for lubricant retention purposes.

It is also known to provide powder metal cylinder bore liners for an internal combustion engine. Typically, the liners are made with powder metal materials. These liners are produced by cold isostatic compaction which provides equal pressure in all directions during compaction.

Although the above powder metal cylinder bore liners have worked well, they suffer from the disadvantage that the cold isostatic compaction process and associated equipment are relatively expensive. Therefore, there is a need in the art to produce self lubricating powder metal cylinder bore liners that are relatively inexpensive to produce and have high volume production.

SUMMARY OF THE INVENTION

Accordingly, the present invention is a method for producing self lubricating powder metal cylinder bore liners for an internal combustion engine. The method includes the steps of loading a powder metal mixture into a die cavity. The method also includes the steps of compacting the powder metal mixture in the die cavity and forming the powder metal cylinder bore liner with a porous structure. The method further includes sintering the powder metal cylinder bore liner and impregnating the porous structure of the powder metal cylinder bore liner with a lubricant.

One feature of the present invention is that a method is provided for producing self lubricating powder metal cylinder bore liners for an internal combustion engine. Another feature of the present invention is that the method produces cylinder bore liners having self-lubricity to maintain a constant lubricant supply to the cylinder bore. Yet another feature of the present invention is that the method is relatively inexpensive compared to conventional processes and no costly honing pattern is necessary. Another feature of the present invention is that the method allows the density of the liners to be lower, resulting in a weight reduction of the liners. Still another feature of the present invention is that the method produces liners having a near net shape without extensive post sintering machinery to achieve desired dimensions. A further feature of the present invention is that the method lends itself to higher volume production and higher tensile strengths by adjusting the powder chemistry. Yet a further feature of the present invention is that the method allows the liners to be easily heat treated to improve wear characteristics and achieve complex surface geometries such as grooves. A still further feature of the present invention is that the method allows a broad spectrum of materials to be used to produce the liner and the powdered materials can be easily recycled by atomization and reduction technologies.

Other features and advantages of the present invention will be readily appreciated as the same becomes better understood after reading the subsequent description taken in conjunction with the accompanying drawings.

BRIEF DESCRIPTION OF THE DRAWINGS

FIG. 3 is a diagrammatic view of a multi-zone furnace for producing the cylinder bore liner of FIG. 1.

FIG. 4 is a diagrammatic view of a vacuum impregnation apparatus for producing the cylinder bore liner of FIG. 1.

DESCRIPTION OF THE PREFERRED EMBODIMENT(S)

Figure 1:
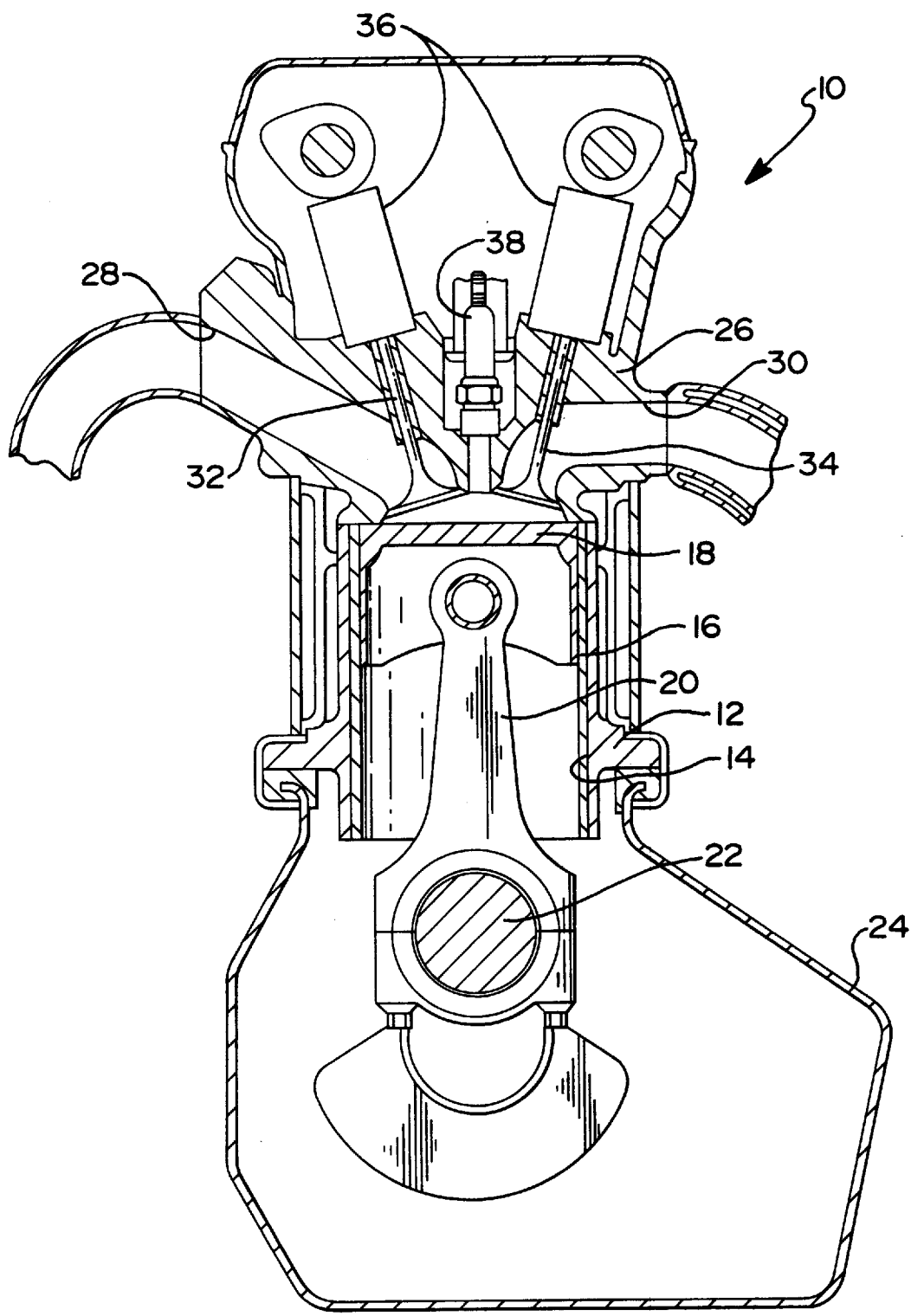
FIG. 1 is a fragmentary elevational view of an internal combustion engine having a cylinder bore liner produced by a method, according to the present invention.

Referring to FIG. 1, an internal combustion engine 10 is illustrated. The internal combustion engine 10 includes an engine block 12 having at least one cylinder bore 14. The internal combustion engine 10 also includes a cylinder bore liner 16, according to the present invention, disposed within the cylinder bore 14 and a piston 18 disposed within the cylinder bore liner 16. The internal combustion engine 10 includes a connecting rod 20 connected to the piston 18 and a crankshaft 22 connected to the connecting rod 20 and rotating within a crankcase 24.

The internal combustion engine 10 further includes a head 26 attached to the engine block 12. The head 26 includes intake passages 28 and exhaust passages 30 opened and closed by intake valves 32 and exhaust valves 34, respectively, and operated by a valve train 36. The head 26 also includes a spark igniter 38 for igniting combustible gases in a combustion chamber between the piston 18 and head 26. It should be appreciated that liquid lubricant such as oil is drawn from the crankcase 24 and splashed within the interior of the engine block 12 to lubricate and bathe the piston 18 during its reciprocal movement therein.

The cylinder bore liner 16 is made of a powder metal mixture. The powder metal mixture is a ferrous grade material according to Standard No. 35 of the Metal Powders Industries Federation (MPIF). For example, the ferrous grade material may be FC0208 of MPIF. Optionally, organic lubricants such as Acrawax and Kenolube may be added to the powder metal mixture to reduce die wall friction. Also, Sulfide may be added to the powder metal mixture to enhance ancillary machining after sintering to be described. The average particle size of the powder metal mixture is about sixty-six microns. It should be appreciated that non-ferrous materials such as aluminum, stainless steel and iron-nickel type powder metal alloys may be used for the powder metal mixture.

Figure 2:
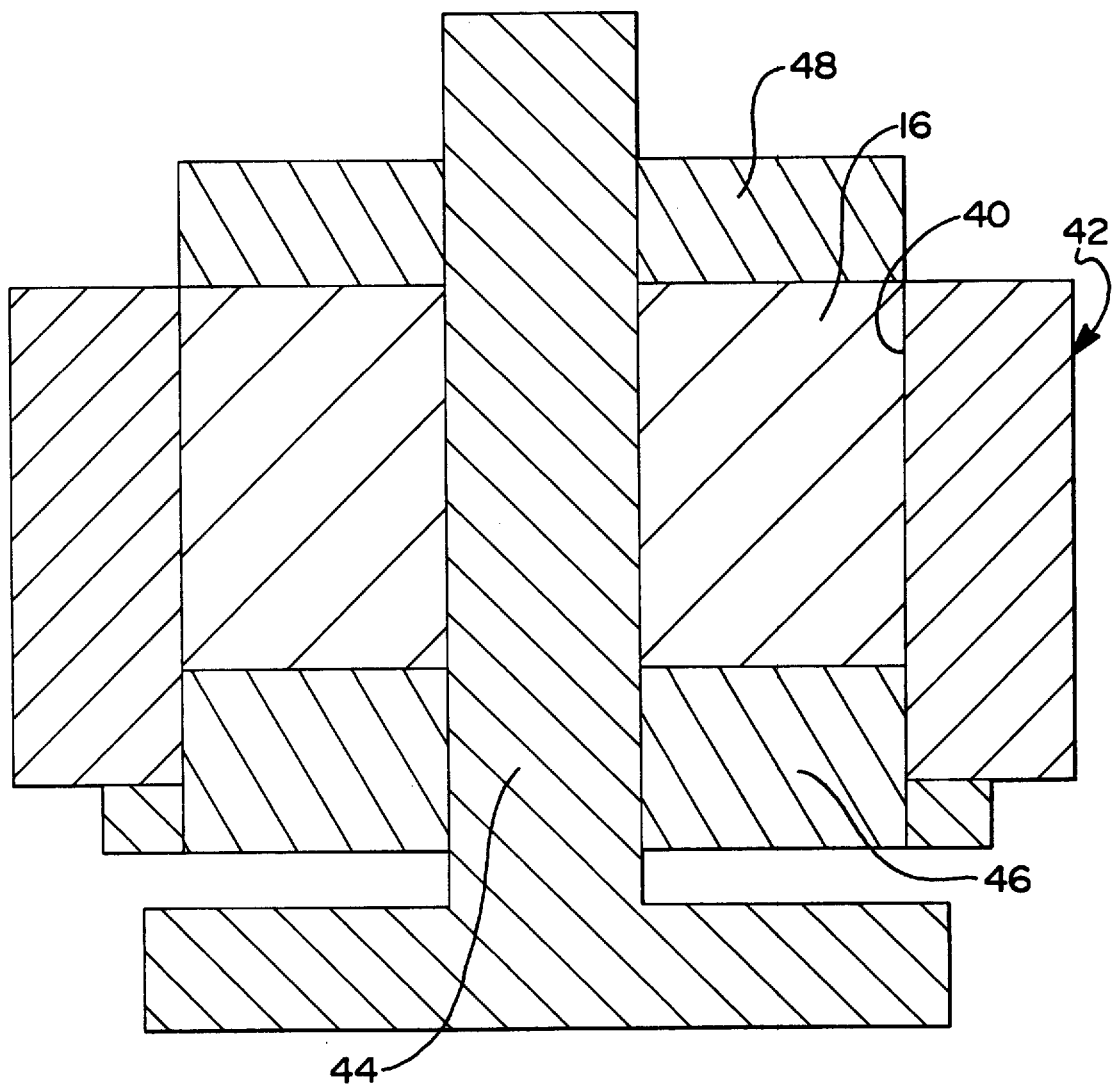
FIG. 2 is a fragmentary elevational view of a die arrangement for producing the cylinder bore liner of FIG. 1.

A method, according to the present invention, is used for producing the powder metal cylinder bore liner 16. In one embodiment, the method uses uniaxial pressure to make a one-piece powder metal cylinder bore liner 16. The method includes the step of loading or transferring the powder metal mixture into a die cavity 40 of a die generally indicated at 42 in FIG. 2. The die 42 is secured to a multi-platen press (not shown) such as a six hundred ton press. The die 42 includes an independent core rod 44 extending through the die cavity 40 and around which the cylinder bore liner 16 is formed. The core rod 44 is attached to one platen (not shown) of the multi-platen press. The die 42 includes a movable bottom punch 46 at a lower or bottom end of the die cavity 40 and attached to another platen (not shown) of the multi-platen press. The die 42 also includes a movable top punch 48 at an upper or top end of the die cavity 40 and attached to yet another platen (not shown) of the multi-platen press. Preferably, the outer surface of the core rod 44 and wall surface of the die cavity 40 are polished to approximately 0.001 inches to reduce friction and force to eject the formed cylinder bore liner 16 from the die cavity 40. The die 42 is formed of carbide or alloy materials. It should be appreciated that the multi-platen press has independent control and balanced platens in order to reduce any shearing effect during compaction to be described.

The method also includes the step of compacting the powder metal mixture in the die cavity 40 using uniaxial pressure from the die 42 and forming the cylinder bore liner 16. The die 42 is held relatively stationary and the bottom punch 46 is moved toward the top punch 48 to produce uniaxial pressure to press the powder metal mixture. The powder metal mixture is pressed with a force sufficient to form a cylinder bore liner 16 with about eight-five percent (85%) to about ninety percent (90%) of its parent material's theoretical density after sintering to be described. For example, thirty-two to forty tons per square inch of compacting pressure will form cylinder bore liners 16 with densities of 6.8 grams per cubic inch, which is approximately eighty-five percent of the theoretical density of the material. This condition leaves a porous structure with about ten percent (10%) to about fifteen percent (15%) for lubricant impregnation to be described. Since the pressure-density relationship is predictable, sufficient pressure should be applied to ensure acceptable density at the center and edges of the cylinder bore liner 16. It should be appreciated that, in some applications where lower mechanical properties would suffice, lower compacting pressure and lower densities may be used. It should also be appreciated that the size of the die cavity 40 may be limited to promote stiffness in the cylinder bore liner 16. It should further be appreciated that the powder size distribution of the powder metal mixture must be selected so as to enhance compaction by balancing the number of fine particles desirable for sintering against larger particles desirable for compaction.

After compacting the powder metal mixture and forming the cylinder bore liner 16, the method includes the step of ejecting the cylinder bore liner 16 from the die cavity 40. The top punch 48 is held down to slide the cylinder bore liner 16 from the die cavity 40 in a series of steps or sections as the die 42 moves toward the bottom punch 46 to allow ejected sections of the cylinder bore liner 16 to stabilize to ambient conditions. When the top punch 48 is held down, density gradients in the cylinder bore liner 16 and any tendency toward the formation of ejection cracks in the cylinder bore liner 16 are minimized. It should be appreciated that the compacted cylinder bore liner 16 is a brittle briquette which must be sintered to develop strength.

The method includes the step of sintering the compacted powder metal cylinder bore liner 16. The cylinder bore liner 16 is sintered in a multi-zone furnace, generally indicated at 50 in FIG. 3. The multi-zone furnace 50 has a plurality of zones along its longitudinal length at various temperatures. At an inlet end, the multi-zone furnace 50 has a rapid burn off (RBO) zone 52 to remove any organic lubricant from the cylinder bore liner 16. The RBO zone 52 is at a temperature from about 1400° F. to about 1450° F. and a high humidity level from about eighty-five percent (85%) and above. The cylinder bore liner 16 moves through the RBO zone 52 at a speed of about two inches per minute. The high humidity level acts as a catalyst to dissolve the organic lubricant from the compacted powder metal cylinder bore liner 16 and a neutral gas such as nitrogen or argon is used to sweep the decomposed gases out of the RBO zone 52 of the multi-zone furnace 50. It should be appreciated that failure to effectively delude the compact, prior to the beginning of high heat sintering will retard the sintering process.

After the RBO zone 52, the multi-zone furnace 50 has a pre-heat zone 54 to gradually ramp up the cylinder bore liner 16 to the sintering temperature. The pre-heat zone 54 is at a temperature of about 1700° F. The cylinder bore liner 16 moves through the pre-heat zone 54 in a time period from about thirty to about forty minutes. A neutral atmosphere of a neutral gas such as nitrogen ($N_2$) is provided in the pre-heat zone 54.

After the pre-heat zone 54, the multi-zone furnace 50 has a high-heat zone 56 to sinter the cylinder bore liner 16. The high-heat zone 56 is at a temperature from about 2050° F. to about 2100° F. The high-heat zone has a low dewpoint of about −40° F. The cylinder bore liner 16 moves through the high-heat zone 56 from about forty-five minutes to about sixty minutes. An atmosphere of hydrogen ($H_2$) is provided in the high-heat zone 56 although a neutral gas such as nitrogen ($N_2$) may be used. It should be appreciated that any atmosphere which promotes carburizing or decarburizing should be avoided.

After the high-heat zone 56, the multi-zone furnace 50 has a cool down zone 58 to cool the sintered cylinder bore liner 16 to room temperature. The cool down zone 58 may have a first stage for gradual cool down. The first stage uses cooled air to gradually bring the temperature of the sintered cylinder bore liner 16 down to about 1600° F. The cool down zone 58 may have a second stage for accelerated cool down. The second stage uses a water core (not shown) around the outside of the multi-zone furnace 50 to rapidly bring the temperature of the sintered cylinder bore liner 16 down to about room temperature. It should be appreciated that the first stage may be eliminated if a sinter hardening powder is added to the powder metal mixture. It should also be appreciated that sinter hardening may be accomplished with the second stage without using a sinter hardening powder. It should further be appreciated that a length L of the high-heat zone 56 is about equal to that of the cool down zone 58 while the RBO zone 52 is about one third of L and the pre-heat zone 54 is about one half of L.

The final cylinder bore liner 16 must be free of microcracks. This condition can be diagnosed through metallographic procedure. The density of the cylinder bore liner 16 should be measured to ensure that uniformity was achieved. A sample should be metallographically prepared and studied under an optical or scanning electron microscope. A uniform grain size is ideal along with isolated, well rounded intermittent pore distribution. If necessary, some ancillary machining may be performed on the cylinder bore liner 16 to produce surface geometry to improve roundness.

The method also includes the step of impregnating the porous structure of the sintered cylinder bore liner 16 with a liquid lubricant such as oil to provide self lubricating properties. The pores of each cylinder bore liner 16 are evacuated and subsequently filled with lubricant using a vacuum impregnation apparatus 60 as illustrated in FIG. 4. The vacuum impregnation apparatus 60 includes a vacuum pump 62 connected by a conduit 64 to a vacuum chamber 66. The vacuum impregnation apparatus 60 also includes a lubricant chamber 58 connected by a conduit 70 and valve 72 to the vacuum chamber 66.

In operation, the vacuum pump 68 creates a vacuum in the vacuum chamber 66 and evacuates the entire pore structure of the cylinder bore liner 16. The vacuum level and the time required to achieve an acceptable vacuum level depends on the density of the cylinder bore liner 16 and the amount of lubricant which is needed to achieve the desired lubricity. After the required vacuum level is attained, the valve 72 is opened to force lubricant into the pore structure of the cylinder bore liner 16. It should be appreciated that a plurality of cylinder bore liners 16 can be impregnated at one time by placing the liners 16 in a carousel 74 which can then be evacuated and filled in the vacuum chamber 66.

The density of the cylinder bore liner 16 can be varied to allow different amounts of lubricants, e.g. five percent (5%), to be satisfactorily forced into the pore structure of the cylinder bore liner 16. This can be achieved by developing density-compacting pressure relationships. This relationship depends on the type, chemistry and particle size distribution of the powder metal material. Any acceptable lubricant for automotive lubrication may be used in the cylinder bore liner 16. It should be appreciated that higher vacuum levels may be necessary for higher viscosity lubricants.

In operation, lubricant which is impregnated into the porous structure of the cylinder bore liner 16 is perpetually available for lubricity. As the temperature of the internal combustion engine 10 increases, the pores or porous structure of the cylinder bore liner 16 expands and releases more lubricant to the surface of the liner 16. During cold conditions, the porous structure of the cylinder bore liner 16 contracts and keeps the supply of lubricant at a constant level. It should be appreciated that this controlled and infinite supply of lubricant can potentially reduce lubricant consumption and power losses in the internal combustion engine 10. It should also be appreciated that the cylinder bore liner 16 which has sufficient strength and temperature resistance needed for engine operation can be produced using conventional powder metal or cold isostatic compaction techniques.

Alternatively, the step of impregnating the porous structure of the sintered cylinder bore liner 16 with a liquid lubricant may be accomplished by dipping the liner 16 into a container of lubricant. The pores of the cylinder bore liner 16 will retain an amount of liquid lubricant to provide self lubricating properties to the cylinder bore liner 16.

Accordingly, the self lubricating powder metal cylinder bore liners 16 reduce friction and wear of the internal combustion engine 10. These liners 16 also reduce lubricant consumption, provide low engine emissions and increase miles per hour and longevity of the internal combustion engine 10.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for producing self lubricating powder metal cylinder bore liners for an internal combustion engine, said method comprising the steps of:

loading a powder metal mixture into a die cavity;

compacting the powder metal mixture in the die cavity and forming a powder metal cylinder bore liner with a porous structure;

sintering the powder metal cylinder bore liner; and impregnating the porous structure of the powder metal cylinder bore liner with a liquid lubricant to provide self lubricating properties.

2. A method as set forth in claim 1 including the step of evacuating the porous structure of the powder metal cylinder bore liner prior to said step of impregnating.

3. A method as set forth in claim 2 wherein said step of impregnating comprises forcing lubricant into the porous structure and filling the porous structure with lubricant.

4. A method for producing self lubricating powder metal cylinder bore liners for an internal combustion engine, said method comprising the steps of:

loading a powder metal mixture into a die cavity;

compacting the powder metal mixture in the die cavity and forming a powder metal cylinder bore liner with a porous structure;

sintering the powder metal cylinder bore liner;

impregnating the porous structure of the powder metal cylinder bore liner with a liquid lubricant to provide self lubricating properties; and rapidly burning of any organic lubricants in the cylinder bore liner prior to said step of sintering.

5. A method as set forth in claim 4 including the step of pre-heating the powder metal cylinder bore liner prior to said step of sintering.

6. A method as set forth in claim 1 wherein said step of sintering comprises sintering the powder metal cylinder bore liner between a temperature from about 2050° F. to about 2100° F.

7. A method as set forth in claim 1 including the step of cooling down the sintered powder metal cylinder bore liner.

8. A method for producing self lubricating powder metal cylinder bore liners for an internal combustion engine, said method comprising the steps of:

loading a powder metal mixture into a die cavity;

compacting the powder metal mixture in the die cavity and forming a powder metal cylinder bore liner with a porous structure;

sintering the powder metal cylinder bore liner;

evacuating the porous structure of the powder metal cylinder bore liner;

impregnating the porous structure with a liquid lubricant to provide self lubricating properties; and filling the porous structure with the liquid lubricant.

9. A method for producing self lubricating powder metal cylinder bore liners for an internal combustion engine, said method comprising the steps of:

loading a powder metal mixture into a die cavity;

compacting the powder metal mixture in the die cavity and forming a powder metal cylinder bore liner with a porous structure;

sintering the powder metal cylinder bore liner;

evacuating the porous structure of the powder metal cylinder bore liner;

impregnating the porous structure with a liquid lubricant to provide self lubricating properties; and filling the porous structure with the liquid lubricant; and rapidly burning of any organic lubricants in the cylinder bore liner prior to said step of sintering.

10. A method as set forth in claim 9 including the step of pre-heating the powder metal cylinder bore liner prior to said step of sintering.

11. A method as set forth in claim 10 wherein said step of sintering comprises sintering the powder metal cylinder bore liner between a temperature from about 2050° F. to about 2100° F.

12. A method as set forth in claim 11 including the step of cooling down the sintered powder metal cylinder bore liner.

* * * * *